US007689748B2

(12) United States Patent
Grossman et al.

(10) Patent No.: US 7,689,748 B2
(45) Date of Patent: Mar. 30, 2010

(54) EVENT HANDLER FOR CONTEXT-SWITCHABLE AND NON-CONTEXT-SWITCHABLE PROCESSING TASKS

(75) Inventors: Mark Grossman, Palo Alto, CA (US); Jeffrey G. Cheng, Toronto (CA); Gordon Caruk, Brampton (CA); Joel Wilke, Toronto (CA); Elaine Poon, San Jose, CA (US)

(73) Assignee: ATI Technologies, Inc., Markham (CA)

( * ) Notice: Subject to any disclaimer, the term of this patent is extended or adjusted under 35 U.S.C. 154(b) by 0 days.

(21) Appl. No.: 11/418,788

(22) Filed: May 5, 2006

(65) Prior Publication Data
US 2007/0260796 A1   Nov. 8, 2007

(51) Int. Cl.
*G06F 13/24* (2006.01)
(52) U.S. Cl. .................... 710/261; 710/269
(58) Field of Classification Search ........... 710/261, 710/269
See application file for complete search history.

(56) References Cited

U.S. PATENT DOCUMENTS

| | | | | |
|---|---|---|---|---|
| 5,261,107 A * | 11/1993 | Klim et al. | ............ | 710/266 |
| 5,951,669 A * | 9/1999 | Bailey et al. | ............ | 710/260 |
| 6,000,040 A * | 12/1999 | Culley et al. | ............ | 714/31 |
| 6,145,047 A * | 11/2000 | Garinger et al. | ............ | 710/261 |
| 6,240,483 B1 * | 5/2001 | Gutta et al. | ............ | 710/260 |
| 6,247,091 B1 * | 6/2001 | Lovett | ............ | 710/260 |
| 6,772,241 B1 * | 8/2004 | George et al. | ............ | 710/36 |
| 6,823,414 B2 * | 11/2004 | Radhakrishna | ............ | 710/262 |
| 6,826,653 B2 * | 11/2004 | Duncan et al. | ............ | 711/141 |
| 6,920,516 B2 * | 7/2005 | Hartwell et al. | ............ | 710/263 |
| 6,941,398 B2 * | 9/2005 | Lai et al. | ............ | 710/260 |
| 6,968,411 B2 * | 11/2005 | Gaur et al. | ............ | 710/260 |
| 7,013,358 B2 * | 3/2006 | Lueck et al. | ............ | 710/260 |
| 7,181,559 B2 * | 2/2007 | Barth et al. | ............ | 710/263 |
| 7,197,588 B2 * | 3/2007 | Tsao et al. | ............ | 710/268 |
| 7,257,658 B2 * | 8/2007 | Winkler et al. | ............ | 710/266 |
| 7,281,075 B2 * | 10/2007 | Armstrong et al. | ............ | 710/267 |
| 7,325,084 B1 * | 1/2008 | Marmash et al. | ............ | 710/269 |
| 7,409,483 B2 * | 8/2008 | Bennett | ............ | 710/261 |
| 2006/0123275 A1 * | 6/2006 | Reynolds, Jr. | ............ | 714/700 |

FOREIGN PATENT DOCUMENTS

EP   827084 A2 *   3/1998

* cited by examiner

*Primary Examiner*—Paul R Myers
(74) *Attorney, Agent, or Firm*—Courtney Staniford & Gregory LLP (57) ABSTRACT

Embodiments of a system and method for handling interrupts are described herein. In an embodiment interrupts from various client components in a system (also referred to as clients) are processed by an interrupt handler component uniformly. The various clients signal interrupts in different manners. For example, some clients signal interrupts in a level-based manner, and some clients signal interrupts in a pulse-based manner. In an embodiment, all interrupts received by the interrupt handler are formed into an event message according to a uniform format regardless of the manner in which the interrupt is signaled. The event message includes all information necessary for a host processor interrupt service routine (ISR) to service the interrupts without reading hardware registers. Event messages are stored in an event buffer for access and handling by the host. The event buffer is managed by the interrupt handler.

41 Claims, 5 Drawing Sheets

EVENT HANDLER FOR CONTEXT-SWITCHABLE AND NON-CONTEXT-SWITCHABLE PROCESSING TASKS

TECHNICAL FIELD

The invention is in the field of scheduling operations in complex data processing systems.

BACKGROUND

In typical complex data processing systems, many different processing tasks or operations are being performed by multiple sub-units of the system at any one time. Usually, all of the operations of the system are under the control of a host processor, or central processing unit (CPU) that runs a particular operating system (OS). The CPU communicates with various input/output (IO) units of the system through one or more buses, such as a peripheral component interface (PCI) bus or a PCI Express (PCIE) bus for example.

The host processor manages operations in the system, including execution of various tasks by various IO units. The IO units must necessarily communicate a lot of information with the host processor in a manner dictated by the OS. For example, when a task is executing on an IO unit and becomes stalled or interrupted, perhaps because of lack of particular data for example, the IO unit generates an interrupt to the host processor in such a way that the host processor can identify the IO unit and the cause of the interrupt, "fix" the cause of the interrupt, and signal the IO unit that the problem is fixed and that it can proceed with the task. Traditionally, interrupts are signaled by the IO unit writing a value to an interrupt status register. According to one scheme, an interrupt status register may contain multiple bits, any one of which signals an interrupt when it is a particular value, such as a logic "1" (also referred to as a logic high). The values in the interrupt status register are OR'd and if any of the values is high, an interrupt signal is sent to the host processor, which must perform a register read to determine which bit or bits are high. The host processor also must perform a register write to clear interrupts after fixing their causes. This interrupt scheme is sometimes referred to as level-based, because the level of the interrupt bit and line remains at the level set by the IO unit until the interrupt is cleared by the host processor.

IO units are often sophisticated special-purpose processors such as graphics processing units (GPUs). As greater processing speeds are demanded for complex functions, such as graphics processing or video processing, techniques for maximizing the use of system resources constantly evolve. System resources include processing units (such as GPUs), and memory. One common technique for maximizing the use of processing system resources is multi-threaded processing, which requires context switching between tasks. Resources capable of context switching encounter an event that causes the pause or stall of one task, and in response, store the current state of the stalled task (also referred to as switching out the current context) and proceed with another task (or switch in another context) while waiting for the cause of the stall to be cured, or fixed. The host processor must be informed of the stall, for example by the resource issuing an interrupt to the host, and the host is responsible for fixing the cause of the interrupt, and informing the resource that it can switch the previous context back in and continue with the operation that had been interrupted. Such interrupts are not level-based, but are typically signaled by a pulse. In addition, such interrupts do not require storage of interrupt status information in a register, or register reads and writes by the host processor.

In a context-switching environment, the traditional register-based signal-clear mechanism no longer works. This is because the interrupt status register becomes context-sensitive. Consider the following scenario: an IO unit client under a particular context generates an interrupt; a moment later the context is switched away. When an interrupt service routine (ISR) of the host comes to service the interrupt, it reads the interrupt status register which now belongs to a different context. There are race conditions in such a scenario. An interrupt delivery mechanism that is functional in context-switching systems is thus required. One mechanism for supporting context-based interrupts over a PCIE bus is called message signaled interrupt, or MSI. Another mechanism for supporting context-based interrupts over a PCIE bus is MSI-X, which is another version of MSI. MSI allows up to 32 different interrupt sources to have their unique messages without the need for the ISR to read hardware registers. MSI-X expands the number of interrupt vectors to up to 2048.

But traditional level-based interrupts should also be supported for transitional systems or system components that support only level-based interrupts and do not support MSI or MSI-X.

In order to support context-switchable environments, one cannot associate a fixed vector with a given interrupt source. One reason is that an interrupt source can be associated with different contexts. Since all interrupt events must be reserved, if an interrupt source is assigned to a fixed vector, it is possible for a vector to be overwritten by a second interrupt before the ISR processes the first interrupt associated with the first context.

Another reason the traditional register-based mechanism is impractical for complex IO units, regardless of whether context switching occurs or not, is that the number of interrupt sources keeps growing. For example, the number of different interrupt sources for a complex GPU exceeds what a single traditional 32-bit interrupt status register can accommodate. If the ISR has to read the interrupt status register, it may need to read more than one register to locate the interrupt source. Register reads from software (the OS) are slow by nature, but the ISR may have hundreds of interrupts per second to service. This creates performance concerns.

In the drawings, the same reference numbers identify identical or substantially similar elements or acts. To easily identify the discussion of any particular element or act, the most significant digit or digits in a reference number refer to the Figure number in which that element is first introduced (e.g., element 102 is first introduced and discussed with respect to FIG. 1).

DETAILED DESCRIPTION

Embodiments of a system and method for handling interrupts are described herein. In an embodiment events, or interrupts from various client components in a system (also referred to as clients) are processed by one event handler, or interrupt handler component uniformly. The various clients signal interrupts in different manners. For example, some clients signal interrupts in a level-based manner, and some clients signal interrupts in a pulse-based manner. In an embodiment, the non-context switchable, level-based components perform permanent tasks, and the pulse based, context switchable components perform serialized volatile tasks. In an embodiment, a permanent task involves a single thread of execution, while a volatile task involves multiple threads of execution by allowing its state to be saved and restored at selected points in time.

In an embodiment, each interrupt received by the interrupt handler is formed into an event message according to a uniform format regardless of the interrupt type or source. The event message includes all information necessary for a host processor interrupt service routine (ISR) to service the interrupts without reading hardware registers. Embodiments include an IO unit interrupt handler that collects all interrupts generated by clients of the IO unit and forms them into event messages. The interrupt handler stores event messages from the input unit into a designated event buffer in memory that is accessible to the host processor, also referred to simply as the host. The interrupt handler also sends an interrupt signal to the host, which responds by reading the event buffer and handling all of the event messages appropriately. The host acknowledges a pulse-based interrupt by updating a read pointer of the event buffer; and acknowledges a level-based interrupt by a register write to clear the interrupt source. In an embodiment, the read pointer is updated by interrupt handler software running on the host after it has read the contents of the event buffer that lie between the current state of the read pointer and the current state of the write pointer. Embodiments further include an adapter unit that receives level-based interrupts from level-based interrupt clients and generates an appropriate event message for storage by the IO unit to the event buffer.

Figure 1:
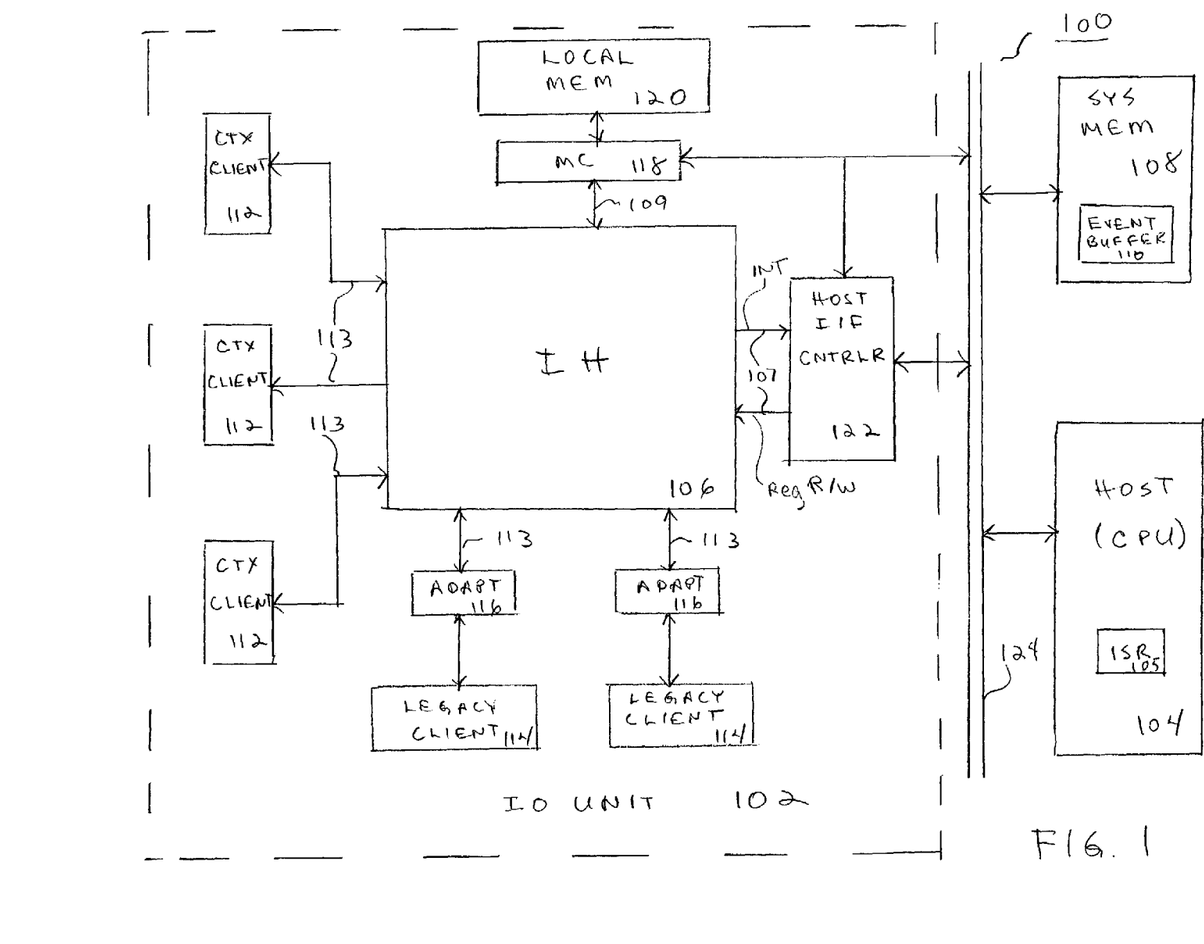
FIG. 1 is a block diagram of a system according to an embodiment.

FIG. 1 is a block diagram of a data processing system 100, including an IO unit 102 and a host processor (also referred to as "host" and central processing unit (CPU)) 104 according to an embodiment. The IO unit 102 and the host 104 communicate via a bus 124. In an embodiment, bus 124 is a peripheral component interface (PCI) bus or a PCI Express (PCIE) bus, but the embodiments are not so limited. The system 100 further includes a system memory 108 that also communicates via the bus 124. The system memory 108 is accessible to any component on the bus according to the applicable protocol.

The host 104 may be any central processing unit, such as a processor that is intended for consumers who wish to run various applications. The host 104 also includes or communicates with hardware and software (not shown) to facilitate transactions on the bus 124. For purposes of this disclosure, the host 104 and other components, such as the memory 108 are understood to communicate via the bus 124 through any necessary hardware and software that it known in such systems, but is not shown here for clarity. For example, various system components may be coupled via one or more bus bridges in a known manner. The IO unit 102 may be any IO unit that is capable of performing a function under control of the host 104 according to the applicable operating system of the host 104. As an example for purposes of illustrating the embodiments, the IO unit 102 is a graphics processing unit (GPU). Embodiments of the invention include any relatively complex IO unit along with a host that is capable of controlling one or more such complex IO units.

The IO unit 102 includes various clients, each of which performs a designated operation or operations. For example, the clients may include various sub-units or components. For example, when the IO unit 102 is a graphics or video processor, the clients may include a 3-D engine, and a video engine. The clients include multiple context-switchable clients 112 and multiple "legacy clients" 114. Herein, the term "legacy" refers to clients that are capable of level-based interrupt signaling, such as a display engine for example. Context-switchable clients 112 typically include such sub-units as 3-D engines and video engines. The numbers of clients 112 and 114 shown herein are for illustration only and are not limiting.

The context-switchable clients 112 and the legacy clients 114 communicate with an interrupt handler 106. The context-switchable clients 112 communicate with the interrupt handler 106 via an interface 113. The legacy clients 114 communicate with respective adapters 116. As further explained below, the adapters 116 facilitate uniform handling by the interrupt handler 106 of both level-based interrupts from the legacy clients 114, and pulse-based interrupts from the context-switchable clients 112. Context-switchable clients 112 perform volatile tasks and generate pulse-based interrupts. Communication between the context-switchable clients 112 and the interrupt handler 106 includes an interruptible message stream. The legacy clients communicate with the interrupt handler 106 via the adapters 116 and an interface 113.

The IO unit 102 further includes a memory controller 118 and a local memory 120. The memory controller 118 has the capability to access the local memory 120, and also the system memory 108 via the bus 124. The host 104 has access to both the system memory 108 and the local memory 120. Accesses of the local memory 120 by the host 104 occur through a host interface controller 122, and are typically slower than accesses of the system memory 108 by the host 104 via the bus 124.

The host interface controller 122 communicates with the interrupt handler 106 via an interface 107. The host interface controller 122 communicates with other system components external to the IO unit 102 via the bus 124 and controls access in both directions between the host 104 and the IO unit 102.

As further described below, the system memory 108 includes an event buffer 110 that is designated to store event messages at the request of the interrupt handler. In various other embodiments, the event buffer may be located elsewhere, such as in the local memory 120, or any other memory location that is accessible by both the interrupt handler 102 and the host 104. The event buffer 110 is read by the host 104, and an interrupt service routine (ISR) 105 of the host 104 handles the interrupts associated with the event messages stored in the event buffer 110.

In an embodiment, the event buffer 110 is allocated in cacheable system memory 108, which allows the ISR 105 to quickly read event messages. The ISR 105 is not expected to write to the event buffer. It is preferable for the write pointer writeback location to be a location that allows the ISR 105 to read the read pointer quickly. In an embodiment in which the IO unit is a GPU, the cacheable system memory is mapped to a graphics address remapping table (GART). In various embodiments the GART may support virtual mappings, per-context mappings, or global, system mappings The size of the event buffer should be sufficient to buffer the speed difference as a result of parallel execution between hardware and software. In worst cases, hardware may be generating interrupts in the order of thousands per second, and software may be overloaded by interrupts. The ISR 105 should try to avoid overflow of the event buffer where possible. In an embodiment, the event buffer 110 stores 4096 event messages of 128 bits each, or 64 Kbytes. The event buffer 110 in various embodiments could be smaller or larger than 64 Kbytes, and can be allocated based on empirical data.

In an embodiment, the control of the event buffer 110 is similar to the control of a ring FIFO buffer. There is a read pointer for the consumer, a write pointer for the producer, and a wrapping mechanism. One property of the event buffer 110 is that the consumer, in this case the ISR 105, can be designed to consume all outstanding interrupt data in the event buffer 110 instead of processing one interrupt and returning, which may be less efficient. By processing all outstanding interrupts, the ISR 105 also has the opportunity to prioritize those interrupts in an order desirable to software.

There may be an issue when the ISR 105 is slowed or stopped while processing interrupts, causing the event buffer 110 to overflow. As hardware cannot wait for software, the choices include stopping the generation of subsequent interrupts, or overwriting unprocessed older interrupts in the event buffer 110. In an embodiment, there is an option to stop the generation of subsequent interrupts, which is controlled by a register setting. It is suggested that losing older interrupts that signaled outdated events is a better choice over losing more recent interrupting events. Therefore there is a flag to indicate such overflow events from hardware, so that the ISR 105 can capture the more recent interrupts by calculating the difference between the read pointer, the write pointer, and taking the overflow flag into account. Embodiments support both losing older interrupts and losing newer interrupts. Under normal situations, software should be able to set up a reasonably sized ring buffer (2048 entries, for example) that is sufficient to buffer interrupts.

Figure 2:
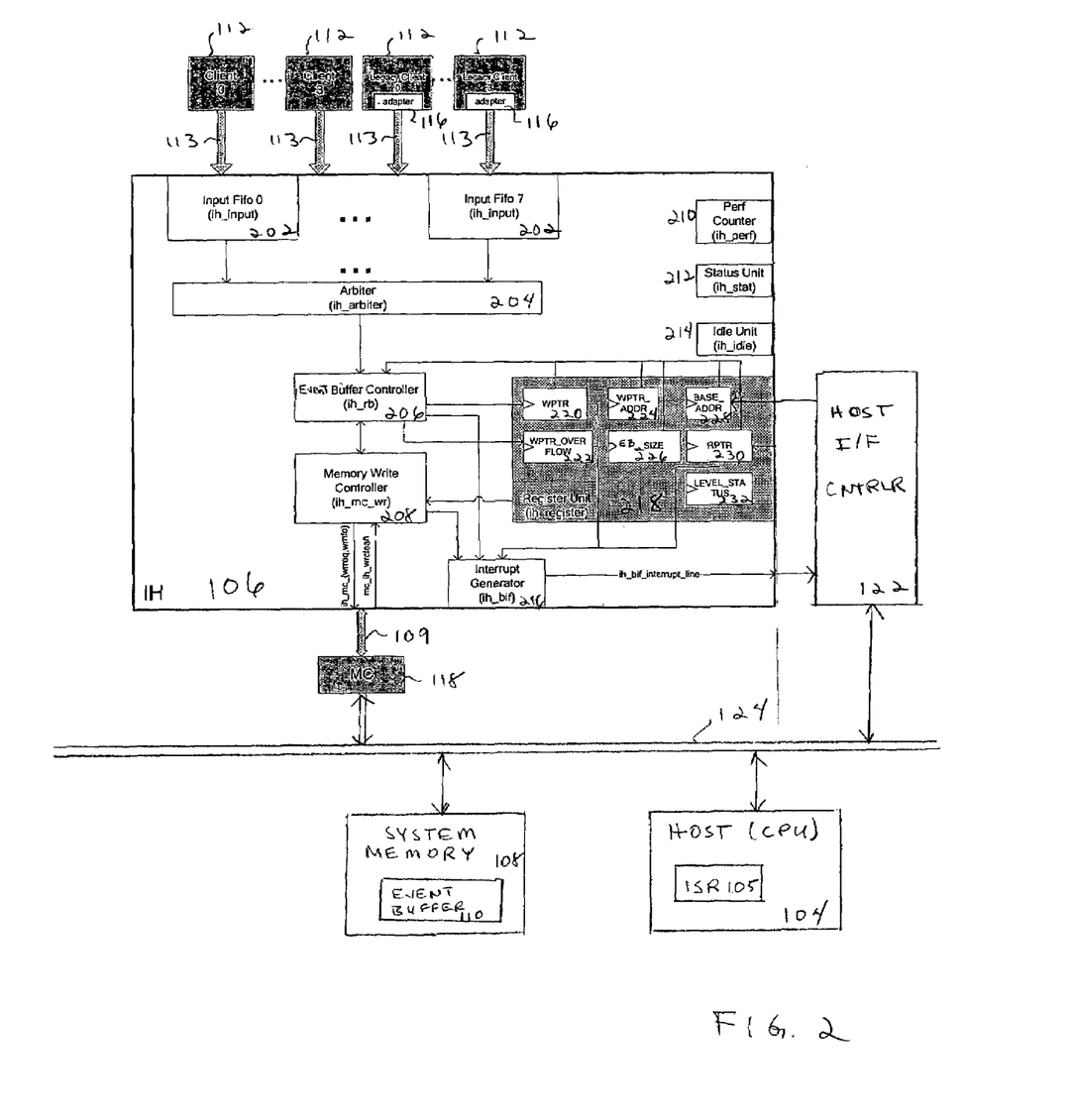
FIG. 2 is a block diagram of an interrupt handler according to an embodiment.

FIG. 2 is a block diagram showing greater detail of the interrupt handler 106.

The interrupt handler 106 sequences through all outstanding interrupt requests from all clients 112 and 114, maintains the event buffer 110, and signals the host interface controller 122 to signal an interrupt to the host 104. There is also an option to stop the generation of subsequent interrupts, which is controlled by a register setting.

As previously shown and described, the interrupt handler 106 communicates with the memory controller 118 and the host interface controller 122, each of which communicate with other system 100 components via the bus 124. The host 104, and the system memory 108 and its event buffer 110 are also shown connected to the bus 124. As previously explained, a connection as shown in the figure may not actually be a direct connection, but is shown as such for clarity of illustration.

Various context-switchable clients 112 are shown, as well as various legacy clients 114. The context-switchable clients 112 and the legacy clients 114 communicate interrupts to the interrupt handler 106 via respective interfaces 113. The interrupts are stored in an input unit 202, which in an embodiment is a series of first-in-first-out buffers (FIFOs) as shown. The input unit 202, in an embodiment, contains a consumer FIFO for each client interface 113. The input unit 202 receives at least one signal from the clients, including an interrupt occurrence and at least one of an interrupt source identifier and an interrupt type identifier.

An arbiter 204 receives interrupt requests from the input unit 202 and arbitrates among them to determine in what order they will be handled (also referred to as serviced or processed). In an embodiment, the arbitration scheme is a round-robin scheme in which the output of the input unit 202 FIFOs is processed in the order received. In other embodiments, as further described below, other arbitration schemes could be employed, including priority assignment based on information in the interrupts.

Each context-switchable client 112 sends an interrupt request to the interrupt handler 106 along with a context identification (context ID) value. In an embodiment, the client-interrupt handler interface 113 includes a CLIENT_IH_interrupt_send signal that indicates the client is sending the interrupt handler 106 an interrupt. The interface 113 further includes a CLIENT_IH_interrupt_id, which in one embodiment is an interrupt source identification (ID) sent over four cycles. The CLIENT_IH_interrupt_id stays active until an acknowledgement is received. An interrupt source ID uniquely identifies the interrupt source.

The interface 113 further includes a CLIENT_IH_interrupt_ctxid signal. From a context-switchable client 113, the CLIENT_IH_interrupt_ctxid is a Context ID associated with an interrupt and sent over four cycles. In one embodiment, the Context ID is 28-bits. In the case of legacy clients 114, this part of the interface 113 may be used to send supplemental information.

The interface 113 further includes a CLIENT_IH_interrupt_free signal that is transmitted to the sender to indicate the interrupt-sending transaction is complete and the sender is free.

The interface 113 further includes a CLIENT_IH_block_status signal, which is a single null-protocol line used by legacy clients 114. In an embodiment, the CLIENT_IH_block_status signal is the OR of all of the legacy client's interrupt status bits. The CLIENT_IH_block_status signal is made available in the interrupt handler level_status register 232.

The event buffer controller 206 receives interrupts and stores them as ordered event messages in the event buffer 110. The event buffer controller 206 keeps track of an event buffer 110 read pointer (RPTR) 230 and an event buffer 110 write pointer (WPTR) 220 to determine if enough space is available for the current event message. Event buffer full, full drain and overflow conditions are also determined in the event buffer controller 206. If there is enough space in the event buffer 110 and memory write controller 208 is ready, the event message is sent to the memory write controller 208. The event buffer WPTR 220 is incremented when the memory write controller 208 acknowledges write clean of memory write requests. A timestamp of the interrupt request is captured in the memory write controller 208 in units of 128-system clock (128-sclk). In an embodiment, the system clock uses a crystal-based clock counter, which provides a relatively more stable clock. The timestamp is packaged with the interrupt request to form an event message. In an embodiment, the WPTR 220 is a hardware pointer and should not be written under normal operations. In an embodiment, the event buffer controller 206 contains a 32-deep FIFO. This FIFO size can be changed, for performance analysis purposes for example.

For context-switchable interrupt clients, each event message includes at least one of a context ID and an interrupt source ID. For non-context-switchable interrupt clients, each event message includes an interrupt source ID and a flag indicating the non-context switched nature of the interrupt, or a unique context ID as the flag. The event message according to an embodiment is 128 bits as illustrated in Table 1.

TABLE 1

| bits | description |
| --- | --- |
| [7:0] | Interrupt Source ID |
| [31:8] | Reserved |
| [59:32] | Source Data (context ID or source-specific status) |
| [95:60] | Reserved |
| [127:96] | SCLK counter divided with a prescribed divider (128) |

The ISR 105 can decide whether a context ID is present when processing an interrupt by doing a table lookup on the Interrupt Source ID field. The full list of interrupt sources (not shown) indicates which are context-specific. Non-context switched interrupt sources can make use of the Source Data field for interrupt-specific information to be delivered to the system, which reduces register reads for the ISR 105.

In an embodiment, the interrupt handler 106 is responsible for generating the interrupt source ID. One option for identifying the interrupt source is to assign a hard-code ID to each of the interrupt sources based on their input line into the interrupt handler 106. The ISR 105 uses the same set of hard-coded IDs to identify the interrupt source. Another option is to set up an array in the interrupt handler 106 internal memory for software to program each interrupt source with a desirable ID. This involves either an index/data register pair for software to assign an arbitrary interrupt source ID, or a self-incrementing counter for software to write the interrupt source IDs to the array in sequential order. This option allows the ISR 105 flexibility to group interrupt sources that go into the same process code paths. Generally, the ISR 105 should be able to process different interrupt sources with pre-coded values with little overhead, even when some interrupts are processed by the same code path. Some components have multiple sources internally, so they will pass the Source ID explicitly. If there is only one internal source for a particular component, its Source ID may be hard-wired.

The SCLK counter is used as a timestamp for each interrupt triggering event. The timestamp is used by software to trace interrupt-generation, in handling time differences, and in debugging potential interrupt problems such as interrupt loss, overrun, anomaly in servicing time intervals, and performance analysis.

Interrupt sources are listed in a table (not shown) that includes various attributes for each source. A "Source Type" attribute indicates whether the ultimate source in the driving component is a level or pulse. A "Combined I/F To IH" attribute indicates that one interrupt interface covers more than one source. Some level-based interrupt clients may choose to OR their internal interrupt sources together to a single line to the interrupt handler. If the interrupt sources are OR'ed, the ISR first identifies the interrupt client from the event buffer, and reads the interrupt status register in the interrupt client. The mask (if applicable) and acknowledgement is also made in the interrupt client rather than the interrupt handler. Most legacy clients provide access to the individual interrupt signals before they are OR'ed. These can make use of the interface adapter described later.

A "FIFO Depth" attribute specifies how many entries are needed for the data link between an interrupt client and the interrupt handler. This is to account for the latency due to the interrupt handler waiting for previous interrupt requests to go through the memory controller. If the memory controller FIFO is full, the interrupt client is back-pressured to stall.

A "Mask & Clear" attribute indicates whether interrupts are permanently lost when the source is masked, and whether an interrupt source needs a register write to clear. Masks are discussed further below. Level-based interrupts cannot be lost because their level remains high until a clear is received from the ISR 105. Pulse-based interrupts are lost when masked, because the interrupts are transient and there is no sticky status maintained.

A memory write controller 208 receives event messages from the event buffer controller 206 and communicates with the memory controller 118 to request writes to the event buffer 110 in the system memory 108. The memory write controller 208 receives an event message from the event buffer controller 206. In an embodiment, the event buffer controller 206 contains a 32-deep FIFO. This FIFO size can be changed, for performance analysis purposes for example. The event messages are sent to the memory write controller 208 on a debit/credit protocol in an embodiment. The default number of credits is 16. The minimum number of credits to send an event message is two.

The memory controller-interrupt handler interface 109 is used to perform writes of event messages to the event buffer 110. In an embodiment, the interface 109 has an aligned write request size of 8 Bytes, with an 8 Byte data field. In an embodiment, a write mask is included, which indicates when asserted that a particular 1 Byte in the write data should be written to memory. For read/write coherency the memory write controller 208 may use two-phase write-clean signals. Any memory controller interface appropriate to the normal operation of the system is applicable to embodiments as described herein.

A register unit 218 performs register writes and reads in an interrupt handler 106 register decode space. Serial register commands are received from the host interface controller 122. The interrupt handler registers in the register unit 218 are updated based on the de-serialized register command. For register reads, the register value is serialized and sent to the host interface controller 122. The register unit 218 includes the WPTR register 220 and the RPTR register 230. The register unit 218 also includes a WPTR address register 224, a base address register 228, a write overflow register 222, and an event buffer size register 226. The event buffer size register 226 in an embodiment contains the size of the event buffer 110 expressed in log 2 of the actual size in DWORDSs. The value is between 3 and 16. Event buffer size=$2^{RB\_SIZE}$ DWORDs. The event buffer is full when $2^{RB\_SIZE}-1$ DWORDs are consumed. A level status register 232 contains the status of each level-based client 114.

The host interface controller-interrupt handler interface 107 is used for the interrupt handler 106 to communicate an interrupt from the interrupt generator 216 to the host 104. The interface 107 is also used by the host 104 to update the RPTR 230 of the interrupt handler 106.

The interrupt handler 106 further includes an interrupt generator 216 that generates an interrupt signal to the host 104 through the host interface controller 122. In an embodiment, the interrupt generator 216 generates rising and falling edges on the an interrupt line. If the event buffer is enabled, the interrupt line is asserted if the RPTR 230 and the WPTR 220 mismatch. If the event buffer is disabled, the interrupt line is asserted based on the OR of client status lines.

A performance counter 210 receives performance signals from all other units in the interrupt controller 106. In an embodiment, two 32-bit performance counters are supported. Events to be profiled are selected from a list in a particular register.

A status unit 212 collects status signals from all the units in interrupt handler 106 and reports them in a status register.

Figure 3:
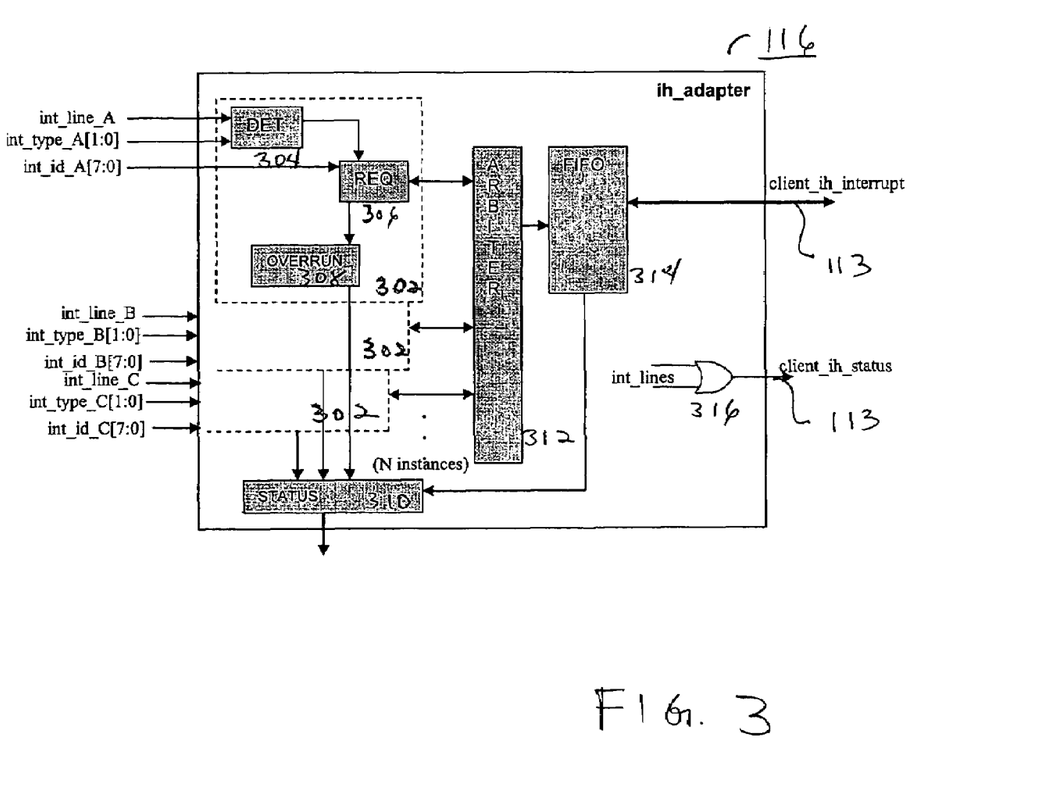
FIG. 3 is a block diagram of an adapter for level-based clients according to an embodiment.

FIG. 3 is a block diagram of an adapter 116 according to an embodiment. The adapter 116 aids in the conversion of non-context switched source interrupt lines—either level or pulsed—to the interrupt handler 106. The adapter 116 may be instantiated close to the interrupt source, particularly when are many interrupt lines from the driving component. If there is a single line the adapter may be placed close to the interrupt handler 106.

For purposes of illustration, the adapter 116 is shown supporting three independent interrupt source lines, int_line_A, int_line_B, and int_line_C, each supported by an input block 302. Each block 302 also receives an int_type_X signal, and an int_id_X signal. The adapter 116 can support any number of lines with any number of blocks 302. Each line is received by detector (DET) unit 304 that can be configured to handle the protocol of the incoming line. A detected new interrupt event goes to a requester unit (REQ) 306 that asks an arbiter (ARB) 312 to queue a new request into a request FIFO 314. Each line also has its own hard-wired source ID, set by tying off the int_id_X inputs. If a new interrupt event arrives before the request is queued, or the request FIFO overflows, an overrun flag is set. New interrupt events are lost if there is an overrun. Overrun status can be read from a status register 310 by the host via the host interface controller. The OR of all level-type inputs (the output of an OR gate 316) is sent to an interrupt handler status register. In an embodiment, the adapter 116 includes line configurations, as shown in Table 2, which determine a line type. Other specific configurations are possible.

TABLE 2

| line_config[1:0] | Line type |
| --- | --- |
| 0 | Level type, low active |
| 1 | Level type, high active |
| 2 | Pulse type, low active |
| 3 | Pulse type, high active |

Figure 4:
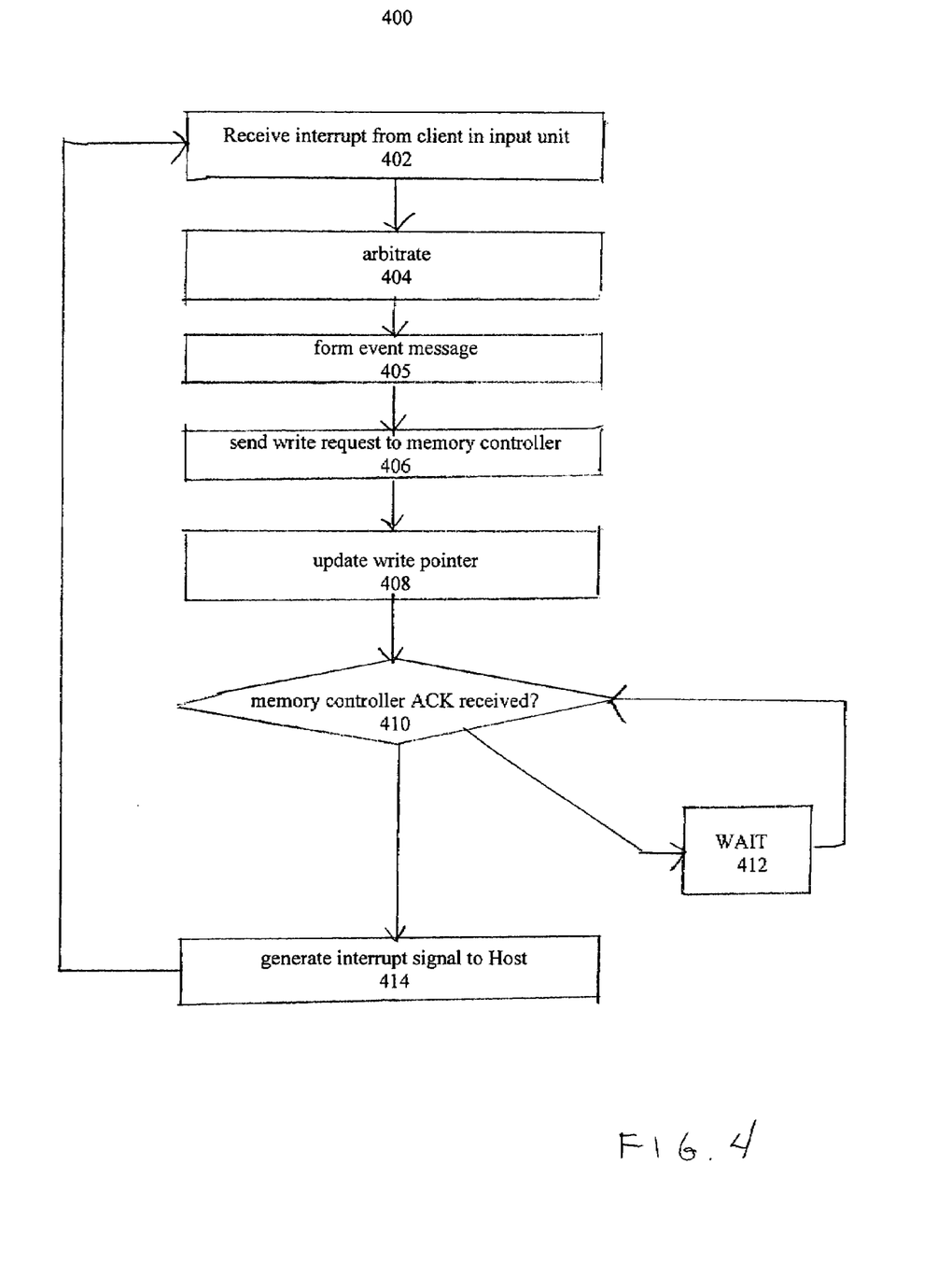
FIG. 4 is a flow diagram illustrating an interrupt process as participated in by an interrupt handler, according to an embodiment.

FIG. 4 is a flow diagram illustrating an interrupt process 400 as participated in by the interrupt handler 106 according to an embodiment. At 402, an interrupt is received in the input unit from a client. At 404 arbitration is performed, including determining in what order received interrupts will be processed according to any one of many arbitration schemes. At 405, an event message is formed from the interrupt. In an embodiment, as described, the event message includes a timestamp and other interrupt-specific information. At 406, a write request is sent to the memory controller, which packages each interrupt into an event message, including a timestamp. The write pointer is updated at 408. At 410, it is determined whether the a memory controller acknowledgement has been received. If the acknowledgement has been received, an interrupt signal is sent to the host at 414. If the acknowledgement has not been received, the process waits at 412 until the acknowledgement is received.

Figure 5:
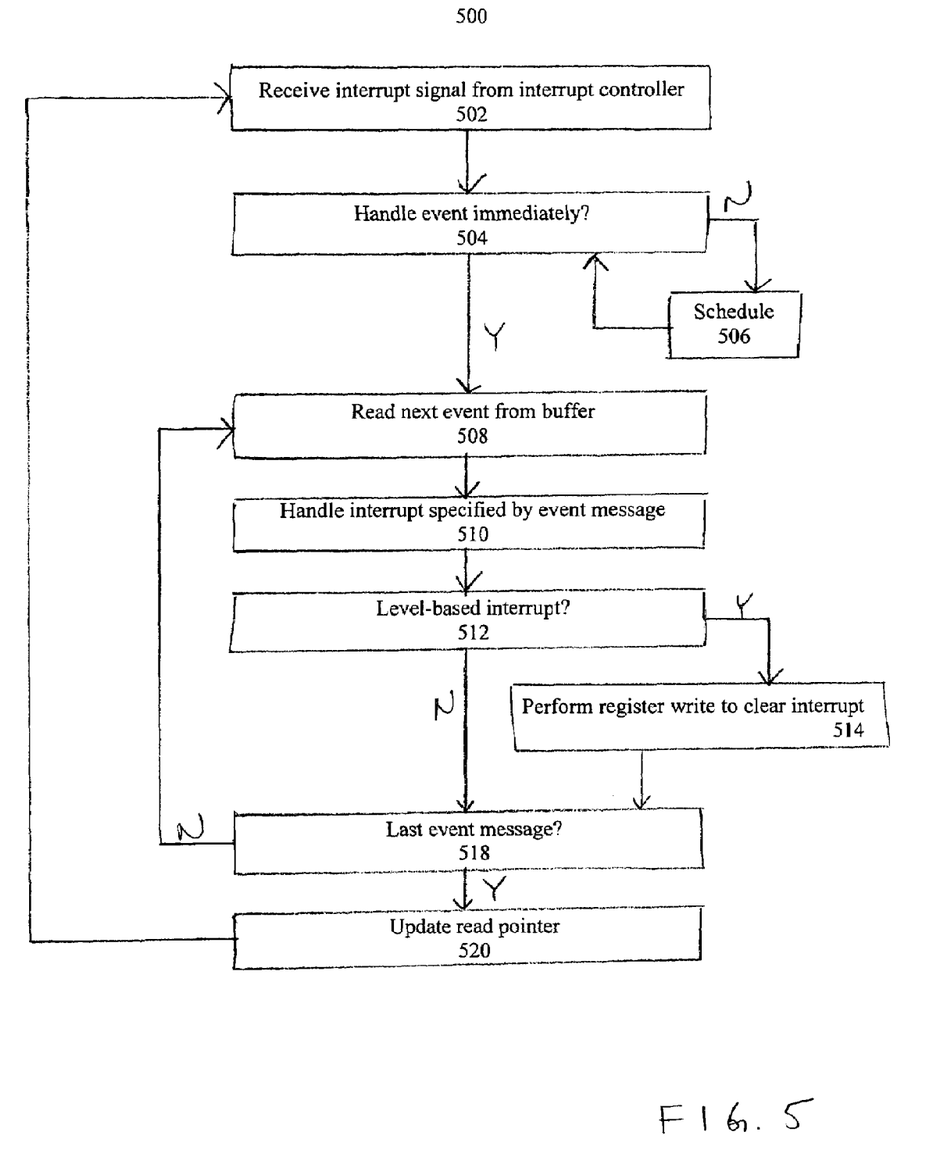
FIG. 5 is a flow diagram illustrating an interrupt process as participated in by a host processor, according to an embodiment.

FIG. 5 is a flow diagram illustrating an interrupt process 500 as participated in by the host 104. At 502, an interrupt signal is received from the interrupt controller. At 504, the host determines whether it will handle the event immediately. If the host will not handle the event immediately, the host schedules the event at 506. In various embodiments, scheduling the event implies that the host waits to handle the event for any reason. If the event is to be handled immediately, the next event message is read from the event buffer at 508. The interrupt specified by the event message is handled at 510. The host determines whether the interrupt is a level-based interrupt at 512. If an interrupt is a level-based interrupt, the host performs a register write to clear the interrupt at 514, and proceeds to 518 to determine whether the event message just read was the last event message. If an interrupt is not level-based, the host proceeds directly to 518 to determine whether the event message just read was the last event message. If the last event message has not been processed, the flow return to 508 and the next event message is read from the event buffer. If the last event message has been processed, the read pointer for the event buffer is updated at 520, and flow returns to 502 when the next interrupt signal is received from the interrupt controller.

Miscellaneous Considerations

Various considerations may apply in different embodiments. Some of these are described below.

"Re-Arm" Mechanism

Accommodation is made in the interrupt handler for legacy interrupt clients that would like to remain unchanged. As previously discussed, legacy interrupts clients use level-based interrupts. When such a client generates an interrupt, it raises its interrupt line. When the ISR has serviced the interrupt, the corresponding register "ACK" bit is cleared by software, and the level goes down. The interrupt handler communicates with the host interface controller with a level-based line. The host interface controller detects the rising and falling edges of the line and generates ASSERT/DE-ASSERT signals (or an MSI message) to the system depending on whether MSI is enabled. The interrupt handler makes a logical OR among all level-based interrupt clients. The interrupt handler also makes a comparison between the read pointer and the write pointer. The interrupt line keeps its level high if any level-based interrupt client has its level high, or when the read pointer and the write pointer mismatch. The line goes low when all level-based interrupts are cleared and the read/write pointers equal. One implication for this level-based interface is that, when MSI is enabled, a "re-arm" mechanism needs to be implemented to trigger another interrupt event for any interrupts remaining unprocessed when the ISR returns to the OS. This implication is further explained in the paragraphs below.

There are two scenarios in which interrupt generation is handled in different ways because the MSI may be enabled or disabled by the system. In both cases below, the ISR is responsible to keep the read pointer register updated when servicing interrupts, and to clear level-based interrupt status registers.

When MSI is disabled, interrupts are handled by system software in the same way as level-based interrupts; that is via the INTx mechanism to check/clear interrupts. Hardware sends ASSERT signal to set INTx when there is an outstanding interrupt, and sends DE-ASSERT signal to clear INTx when there is no outstanding interrupt. The host interface controller detects the rising and falling edges from the interrupt handler. A rising edge triggers an ASSERT signal to the system, and a falling edge triggers a DE-ASSERT signal to the system.

Generation of a new interrupt will set the IH_host-interface-controller interrupt line to high, which will trigger an ASSERT. If the line is already high, a new interrupt generated will have no effect because INTx is already set, and a new ASSERT is ignored by the system. When the ISR finishes processing and returns to the caller (e.g., the OS), if there is an outstanding interrupt, the caller will call the ISR again because INTx has not been cleared.

When all interrupts are processed, the read and write pointers will be equal (and the write pointer overflow bit is cleared), and all level-based interrupts are cleared. In that case the IH→host-interface-controller interrupt line goes low, which triggers a DE-ASSERT signal to clear INTx.

In an MSI-enabled environment, interrupts are signaled by messages (as memory write requests) rather than levels. A new message needs to be sent by hardware if the ISR did not process all outstanding interrupts in its previous run. For example, there can be a second interrupt generated during the ISR processing of the first interrupt. The ISR is unaware of the second interrupt because it has passed the point of reading the write pointer, or it has passed reading the interrupt status register. When the ISR returns to the caller, the second interrupt remains unprocessed. Hardware needs to recognize this outstanding interrupt and issue another MSI event. Otherwise, unless there are subsequent interrupts, the second interrupt is effectively lost. Even if there is third interrupt coming, the ISR has to wait longer to catch the second interrupt, which may not be a good option for performance reasons.

The host interface controller detects the rising edges from the interrupt handler. A rising edge triggers an MSI message. Falling edges are ignored. If there is a second interrupt generated while the first one has not been cleared, the IH→host-interface-controller interrupt line will remain high. There will be no rising edge for the second interrupt, so there will not be a new MSI message. To solve this issue, a "re-arm" mechanism injects a temporal low-level in the IH→host-interface-controller interrupt line in order to get another rising edge. The new rising edge will then trigger a new MSI message to the system. The pulse needs to be maintained for two or more cycles to safeguard the pulse detection in the host interface controller.

In order to "re-arm," the ISR programs a "re-arm" register every time before it returns to the caller. This gives the system an opportunity to generate a new MSI message to call the ISR again, if there is an outstanding interrupt. When the event buffer is enabled, because the ISR needs to update the read pointer each time, writing to read pointer serves as a trigger for the interrupt handler to determine if read pointer=write pointer, and if all levels from legacy clients are low. A pulse is inserted on the IH→host-interface-controller line if either of the two conditions is not met. When the event buffer is disabled, the check of read pointer=write pointer is suppressed and only levels for legacy clients are checked. For consistency, writing to the read pointer again serves as a re-arm trigger.

Lossless Mask

For pulse-based interrupts, masking new interrupts would mean their permanent loss. This is because they are temporal interrupts without a sticky status register. When the mask is turned on, an interrupt is not triggered. When the mask is turned off, the interrupts are already gone. Whether this is acceptable depends on how software will be using those interrupt masks. In some cases, all masks are on at initialization time. When an ISR client registers, the corresponding mask is turned off, and that interrupt is enabled. Of course, an ISR client can come and go dynamically, but the client would not be interested in past interrupts (before its registration time). It should be acceptable for such clients to lose older interrupts from before their lifetime. There are some exceptional interrupts which gets masked on/off from time to time without re-registering. In this case, an additional interrupt may be added after turning off the mask. Masking level-based interrupts does not cause any loss.

Aspects of the embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices, and standard cell-based devices, as well as application specific integrated circuits (ASICs) and fully custom integrated circuits. Some other possibilities for implementing aspects of the embodiments include microcontrollers with memory (such as electronically erasable programmable read only memory (EEPROM)), embedded microprocessors, firmware, software, etc. Furthermore, aspects of the embodiments may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word, any of the items in the list, all of the items in the list, and any combination of the items in the list.

The above description of illustrated embodiments of the system and method is not intended to be exhaustive or to limit the invention to the precise forms disclosed. While specific embodiments of, and examples for, the system and method are described herein for illustrative purposes, various equivalent modifications are possible within the scope of the invention, as those skilled in the relevant art will recognize. The teachings of the disclosure provided herein can be applied to other systems, not only for systems including graphics processing or video processing, as described above. The various operations described may be performed in a very wide variety of architectures and distributed differently than described. In addition, though many configurations are described herein, none are intended to be limiting or exclusive.

In other embodiments, some or all of the hardware and software capability described herein may exist in a printer, a camera, television, a digital versatile disc (DVD) player, a handheld device, a mobile telephone or some other device. The elements and acts of the various embodiments described above can be combined to provide further embodiments. These and other changes can be made to the system and method in light of the above detailed description.

In general, in the following claims, the terms used should not be construed to limit the system and method to the specific embodiments disclosed in the specification and the claims, but should be construed to include any processing systems and methods that operate under the claims. Accordingly, the system and method is not limited by the disclosure, but instead the scope of the method and system is to be determined entirely by the claims.

While certain aspects of the method and system are presented below in certain claim forms, the inventors contemplate the various aspects of the method and system in any number of claim forms. For example, while only one aspect of the system and method may be recited as embodied in computer-readable medium, other aspects may likewise be embodied in computer-readable medium. Accordingly, the inventors reserve the right to add additional claims after filing the application to pursue such additional claim forms for other aspects of the system and method.

What is claimed is:

1. A system comprising:
    a plurality of clients that perform processing tasks, and that signal interrupts in one or more of a plurality of manners;
    an interrupt handler coupled via a system bus to a host interface controller, at least one host processor, and through a memory controller to a system memory, the interrupt handler further coupled directly to the plurality of clients, wherein the interrupt handler is operable,
        to receive interrupts signaled by the plurality of clients;
        to arbitrate among the received interrupts to determine in what order the received interrupts are to be handled;
        to form an event message for each received interrupt signaled in one or more of the plurality of manners, wherein forming an event message comprises forming different event messages for different types of clients that; and
        to request the memory controller to write the event messages in an event buffer, such that the event messages are accessible via the system bus to the at least one host processor for processing as interrupts, wherein the at least one host handles interrupts specified by event messages according to the manner in which the interrupt were signaled, including performing a register write for a level-based interrupt.

2. The system of claim 1, wherein the event message comprises at least one of a timestamp, interrupt source identification information, and context information.

3. The system of claim 1, wherein the plurality of clients comprises a context-switchable client that performs volatile tasks, and wherein communication between the context-switchable client and the interrupt handler comprises an interruptible message stream.

4. The system of claim 2, wherein the plurality of clients comprises a context-switchable client that performs volatile tasks, and wherein communication between the context-switchable client and the interrupt handler comprises an interruptible message stream.

5. The system of claim 3, wherein the interrupt handler further comprises an event buffer controller coupled to the arbiter and configurable to maintain an event buffer in a memory area of the system, wherein the event buffer receives interrupts and stores the interrupts as ordered event messages in an event buffer.

6. The system of claim 5, wherein the plurality of clients comprises a context-switchable client that performs volatile tasks, wherein a volatile task involves multiple threads of execution by allowing its state to be saved and restored at selected points in time, and wherein communication between the context-switchable client and the interrupt handler comprises an interruptible message stream.

7. The system of claim 5 wherein the interrupt handler further comprises a memory write controller coupled to the event buffer controller, wherein the memory write controller is configurable to receive event messages and communicate with a memory controller to perform writes of the event messages into the event buffer.

8. The system of claim 5, wherein the interrupt handler further comprises a register unit that stores data comprising a write pointer for the event buffer, and a read pointer for the event buffer.

9. The system of claim 8, wherein the plurality of manners comprises level-based interrupt signaling and pulse-based interrupt signaling.

10. The system of claim 1, wherein the plurality of manners comprises level-based interrupt signaling and pulse-based interrupt signaling.

11. The system of claim 9, wherein the data stored in the register unit further comprises a level status for clients that perform level-base interrupt signaling.

12. The system of claim 7, further comprising an interrupt generator coupled to the memory write controller and to the host interface controller, and configurable to generate the interrupt signal to the host.

13. The system of claim 1, wherein the plurality of manners comprises level-based interrupt signaling and pulse-based interrupt signaling, and further comprising an adapter coupled to clients that perform level-based interrupt signaling, wherein the adapter receives a level-based interrupt signal and transmits an interrupt to be received by the interrupt handler, and a client status signal indicating a level status information.

14. The system of claim 13 wherein the adapter is configurable to generate a level status signal that indicates a level status of a coupled client.

15. The system of claim 1, further comprising an input unit coupled to receive at least one signal from a coupled client comprising an interrupt occurrence and at least one of an interrupt source identifier and an interrupt type identifier.

16. A method in a data processing system, the method comprising:
    receiving a plurality of interrupts from a plurality of clients, wherein the plurality of interrupts include level-based interrupts and pulse-based interrupts;
    arbitrating among the received interrupts to determine in what order the received interrupts are to be handled by a host processor;
    forming an event message for each interrupt received, wherein the event message comprises a format that is the same for level-based interrupts and pulse-based interrupts, but includes different information; and
    requesting through a memory controller that the event messages be written to a designated area of a system memory that is accessible to a plurality of host processors that handle interrupts, wherein a host handles interrupts specified by event messages according to the manner in which the interrupt were signaled, including performing a register write for a level-based interrupt.

17. The method of claim 16, wherein the event message comprises at least one of, a timestamp, interrupt source identification information, and context information.

18. The method of claim 16, further comprising adapting level-based interrupts, comprising:
    receiving a level-based interrupt;
    receiving at least one of an interrupt type signal for the level-based interrupt, and an interrupt identification signal for the level-based interrupt; and
    arbitrating among the received interrupts, including pulse-based interrupts and level-based interrupts.

19. The method of claim 18, further comprising;
    storing the received level-based interrupt signals; and
    transmitting one interrupt signal of the stored interrupt signals to a component for formation of an event message.

20. The method of claim 19, wherein the multiple level-based interrupt signals are received from one client.

21. The method of claim 19, further comprising generating a level status signal that indicates a level status of the one client.

22. A method for processing interrupts, comprising:
receiving an interrupt from a client, comprising one or more of a message signaled interrupt (MSI) and a level-based interrupt;
arbitrating among the received interrupt and other received interrupts to determine in what order the received interrupts are to be handled by a host processor;
generating an event message from the interrupt, wherein the event message is in a same uniform format for an MSI and for a level-based interrupt;
transmitting a write request to a memory controller to request a write of the event message to an area in memory designated for event message storage, wherein the memory area is commonly accessible to a plurality of hosts; and
generating an interrupt signal to a host upon acknowledgement of the write request, wherein the interrupt signal indicates to the host that there are event messages in the area in memory, wherein the host handles interrupts specified by event messages according to the manner in which the interrupt were signaled, including performing a register write for a level-based interrupt.

23. The method of claim 22, further comprising updating a write pointer of the area in memory.

24. The method of claim 22, wherein the interrupt received from the client comprises one of a level-based interrupt and a pulse-based interrupt.

25. A method for handling interrupts, comprising:
an interrupt handler receiving multiple interrupts of different types from a plurality of clients of different types;
the interrupt handler arbitrating among the multiple interrupts to determine an order in which the interrupts are to be handled by a plurality of host processors;
the interrupt handler forming an event message in a consistent format for each of the interrupts of different types;
one of the plurality of host processors receiving an interrupt signal from an interrupt controller;
the host processor reading an event buffer that stores the event messages the plurality of clients, wherein the event buffer is commonly accessible to the plurality of host processors;
the host processor handling an interrupt specified by the event message read from the event buffer, wherein the host handles interrupts specified by event messages according to the manner in which the interrupt were signaled, including performing a register write for a level-based interrupt; and
the host processor signaling to the interrupt controller that the interrupt has been handled.

26. The method of claim 25, wherein the different types of clients comprise level-based clients and pulse-based clients.

27. The method of claim 26, wherein for an interrupt signaled by a level-based client, signaling that the interrupt has been cleared comprises performing a register write to clear the interrupt.

28. The method of claim 26, wherein for an interrupt signaled by a pulse-based client, signaling that the interrupt has been received and can be emptied from the event buffer comprises updating a read pointer associated with the area in memory, wherein the read pointer is stored by the interrupt handler, and the event buffer is maintained by the interrupt handler.

29. A computer-readable medium having instructions stored thereon, which when executed in a system cause an interrupt handling method to be performed, the method comprising:

an interrupt handler receiving multiple interrupts of different types from a plurality of clients, comprising clients that signal interrupts in different manners;
the interrupt handler arbitrating among the multiple interrupts to determine an order in which the interrupts are to be handled by a plurality of host processors;
the interrupt handler generating an event message in a uniform format for each interrupt, signaled in one or more of the plurality of manners;
the interrupt handler storing event messages in an event message storage area in a memory component that is accessible to a plurality of hosts responsible for servicing the interrupts, wherein storing comprises requesting a memory controller to perform a write to the memory component, wherein a host handles interrupts specified by event messages according to the manner in which the interrupt were signaled, including performing a register write for a level-based interrupt; and
the interrupt handler signaling one of the plurality of hosts that event messages are in the event message storage area.

30. The computer-readable medium of claim 29, wherein the method further comprises maintaining the event message storage area including maintaining a write pointer, a read pointer, and an overflow status.

31. The computer-readable medium of claim 29, wherein the manner in which an interrupt is signaled comprises level-based signaling and pulse-based signaling, and wherein the method further comprises adapting level-based received interrupts such that the event message is generated in a same format as for a pulse-based interrupt.

32. The computer-readable medium of claim 31, wherein the method further comprises maintaining a level status for clients that use level-based signaling.

33. The computer-readable medium of claim 29, wherein the method further comprises:
switching out a context for clients that use pulse-based signaling;
receiving an indication from the host when a pulse-based interrupt has been handled; and
switching back in the context that was switched out.

34. A system comprising:
a plurality of components that perform tasks and report events, wherein the plurality of components comprises level-based components and pulse based components, and wherein the level-based components perform permanent tasks and the pulse-based components perform volatile tasks, wherein a permanent task involves a single thread of execution, and a volatile task involves multiple threads of execution by allowing its state to be saved and restored at selected points in time; and
an event handler coupled directly to the plurality of components, and further coupled via a system bus to a host interface controller, at least one host processor, and through a memory controller to a system memory, wherein the event handler is operable,
to receive interrupts signaled by the plurality of components, including different types of interrupts for the level-based components and the pulse based components;
to arbitrate among the received interrupts to determine in what order the received interrupts are to be handled;
to form an event message for each received interrupt signaled, including event messages in a consistent format for the different types of interrupts; and
to request the memory controller to write the event messages in an event buffer, such that the event messages are accessible via the system bus to the at least one host processor for processing as interrupts, wherein the at least one host handles interrupts specified by event messages according to the manner in which the interrupt were signaled, including performing a register write for a level-based interrupt.

35. The system of claim 34, wherein the volatile tasks comprise serialized tasks.

36. The system of claim 34, further comprising an adapter coupled between the plurality of level-based clients, wherein the adapter is configurable to facilitate uniform handling of events reported by both level-based components and pulse-based components.

37. The system of claim 36, wherein the event handler further manages the event buffer, comprising managing an event buffer read pointer and an event buffer write pointer.

38. An interrupt handler apparatus, comprising:
an input unit coupled to a plurality of clients, wherein the plurality of clients include pulse-based clients that generate pulse-based interrupts and level-based clients that generate level-based interrupts;
an arbiter coupled to the input unit, wherein the arbiter receives the pulse-based interrupts and the level-based interrupts and determines an order in which the interrupts are to be handled;
an event buffer manager coupled to the arbiter to receive the pulse-based interrupts and the level-based interrupts, wherein the event buffer manager generates an event message in a predefined format for each of the pulse-based interrupts and the level-based interrupts;
a memory write controller coupled to the event buffer manager and configurable to request a write operation to a system memory to write the event messages to an event buffer, wherein the event buffer is accessible via a system bus to a plurality of hosts that process the interrupts, wherein a host handles interrupts specified by event messages according to the manner in which the interrupt were signaled, including performing a register write for a level-based interrupt.

39. The system of claim 38, wherein the event buffer manager further manages access to the event buffer.

40. The system of claim 39, wherein the interrupt handler further comprises an interrupt generator that generates an interrupt signal to one of the plurality of host processors when there are event messages stored in the event buffer for one of the plurality of host processors.

41. The system of claim 40, wherein the interrupt handler further comprises a register unit comprising a read pointer and a write pointer for the event buffer.

* * * * *